(12) United States Patent
Timus et al.

(10) Patent No.: US 8,976,679 B2
(45) Date of Patent: Mar. 10, 2015

(54) METHOD AND COMMUNICATION NETWORK NODE FOR IMPROVING COMMUNICATION PERFORMANCE

(75) Inventors: Bogdan Timus, Spånga (SE); Åsa Bertze, Spånga (SE); Kimmo Hiltunen, Esbo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 177 days.

(21) Appl. No.: 13/699,607

(22) PCT Filed: Jun. 9, 2010

(86) PCT No.: PCT/SE2010/050643
§ 371 (c)(1),
(2), (4) Date: Nov. 21, 2012

(87) PCT Pub. No.: WO2011/155881
PCT Pub. Date: Dec. 15, 2011

(65) Prior Publication Data
US 2013/0070612 A1 Mar. 21, 2013

(51) Int. Cl.
*G01R 31/08* (2006.01)
*G06F 11/00* (2006.01)
(Continued)

(52) U.S. Cl.
CPC .................................... *H04W 24/02* (2013.01)
USPC ........................................................ 370/241

(58) Field of Classification Search
CPC ....... H04W 24/00; H04B 17/00; H04L 43/50; H04J 3/14
See application file for complete search history.

(56) References Cited

U.S. PATENT DOCUMENTS 5,711,001 A * 1/1998 Bussan et al. .............. 455/432.1
5,764,756 A * 6/1998 Onweller ...................... 379/242
(Continued)

FOREIGN PATENT DOCUMENTS

EP 2180742 A1 4/2010
EP 2182753 A1 5/2010
(Continued)

OTHER PUBLICATIONS

Donegan, Michelle; Backhaul Clouds Metro Femto Vision; published on Apr. 21, 2009; Unstrung's webpage: http://www.unstrung.com/document.asp?doc_id=175620; pp. 1-4.

*Primary Examiner* — Hassan Phillips
*Assistant Examiner* — Prenell Jones
(74) *Attorney, Agent, or Firm* — Coats & Bennett, PLLC

(57) ABSTRACT

The present solution relates to enabling improved performance for a user equipment UE (205) in a communication network (200). A network node (210) detects (301, 401) that wireless performance between the UE (205) and a base station (201) is poor. Then, it identifies (302,402) a location of the UE (205) where the poor performance is detected, obtains (303,403) an identity associated with the UE (205), obtains (304,404) an address associated with the UE (205) and identifies (305,405) that the location of the UE (205) is residential and that the address corresponds to the location. The node (210) searches (306,406) for a wireline connection (219) located within a distance from the UE (205). The node (210) establishes (307,407) whether the performance for the UE (205) would be improved by providing services from a core network (209) to the UE (205) via the wireline connection (219) using the home base station (215).

15 Claims, 8 Drawing Sheets

(51) Int. Cl.
  *G08C 15/00* (2006.01)
  *H04J 1/16* (2006.01)
  *H04J 3/14* (2006.01)
  *H04L 12/26* (2006.01)
  *H04L 12/28* (2006.01)
  *H04W 24/02* (2009.01)

(56) References Cited

U.S. PATENT DOCUMENTS

| | | | |
|---|---|---|---|
| 6,381,457 B1* | 4/2002 | Carlsson et al. | 455/435.2 |
| 6,937,869 B1* | 8/2005 | Rayburn | 455/457 |
| 7,068,624 B1* | 6/2006 | Dantu et al. | 370/331 |
| 7,711,349 B2* | 5/2010 | Buckley et al. | 455/404.2 |
| 7,991,393 B1* | 8/2011 | Cook et al. | 455/426.2 |
| 8,386,465 B2* | 2/2013 | Ansari et al. | 707/713 |
| 8,644,849 B2* | 2/2014 | Crandall et al. | 455/456.1 |
| 2002/0127994 A1 | 9/2002 | Stanners | |
| 2002/0191561 A1* | 12/2002 | Chen et al. | 370/331 |
| 2005/0260973 A1* | 11/2005 | van de Groenendaal | 455/411 |
| 2008/0183522 A1* | 7/2008 | Ehrman et al. | 705/7 |
| 2008/0233982 A1* | 9/2008 | Smith et al. | 455/466 |
| 2009/0131020 A1* | 5/2009 | van de Groenendaal | 455/411 |
| 2013/0094390 A1* | 4/2013 | Chhabra | 370/252 |
| 2013/0315144 A1* | 11/2013 | Karaoguz et al. | 370/328 |

FOREIGN PATENT DOCUMENTS

| | | |
|---|---|---|
| WO | 2007106005 A1 | 9/2007 |
| WO | 2008109850 A1 | 9/2008 |
| WO | 2010040417 A1 | 4/2010 |

* cited by examiner

METHOD AND COMMUNICATION NETWORK NODE FOR IMPROVING COMMUNICATION PERFORMANCE

TECHNICAL FIELD

This invention relates generally to a communication network node and a method in the communication network node. More particularly this invention relates to enabling improved communication performance for a user equipment in a communication network.

BACKGROUND

A clear distinction has traditionally been made between wireless and wireline services, as well as between access networks providing these services.

Typical examples of wireless services are the voice services provided by cellular mobile networks and the radio and TV broadcast services provided by the broadcast networks One characteristic of these networks is that they provide almost ubiquitous access to the services, i.e. almost full coverage. The quality of the service is directly related to the quality of the radio signal received by the users, hence the radio signal quality is an important performance parameter used by the service provider when deploying and operating the access network.

Typical examples of wireline service are landline telephony, typically provided by twisted pair copper connections, and cable TV, typically provided by coaxial cables. Development of digital technology during the last decades have allowed for the provided services to be distinguished from the technology used by the underlying access network. Thus, customers may nowadays be offered a bundle of telephony, TV and internet access, irrespective of the physical type of connection.

From the end user perspective, the distinction between wireless and wireline realms may become less clear due to two reasons. First, the connection to a wireline network may often be done by means of a radio interface, such as a Digital Enhanced Cordless Technology (DECT) network in case of a phone, or a Wireless Local Area Network (WLAN) connection in the case of internet access. Second, similar services are provided by both wireless and wireline access networks, such as internet access or TV programs. For instance, a phone connection using the application Skype on a Personal Digital Assistant (PDA) over a WLAN may give a rather similar experience to a phone connection over a cellular network, although the underlying technology and the business models may be completely different. An important difference is that the quality of the cellular connection is monitored and guaranteed by the mobile operator, while the WLAN is a user deployed extension of a wireline access network for which the service provider has no responsibility.

A further aspect that blurs the distinction between the wireless and the wireline realms is that many cellular terminals or user equipments have the necessary interfaces to also connect to a WLAN. Thus, the user equipment may route its data through a wireline access network instead of the cellular access network. In most of the cases, the user equipment is logically connected to a network that is distinct from the cellular network, e.g. it receives a new or separate Internet Protocol (IP) address. However, in other cases the WLAN may be deployed by the mobile operator and incorporated into the mobile network. Thus, the mobile network retains the logical control over the user equipment, the access network behind the WLAN connection is integrated into the mobile network and the connection to the WLAN may be seen as a handover between different access technologies.

The mobile, i.e. wireless, and the fixed, i.e. wireline, networks are expected to merge in the future from a physical, logical, and business point of view, so that the end user may seamlessly take benefit of both types of infrastructures. Nonetheless, this fixed mobile convergence might not be relevant for all the operators, as some operators may continue to own only one type of access network and provide only wireless, respectively only wireline, access services even in the future.

A clear distinction has traditionally been made between user deployed and operator deployed wireless networks. In the former case, the customer typically takes full responsibility for the acquisition of the equipment, and for the network deployment and operation. The equipment is of consumer electronics type, and the network is operated in unlicensed bands. A typical example is the family of products and networks based on the Institute of Electrical and Electronics Engineers (IEEE) standards.

In the latter case, an operator acquires the equipment, deploys the infrastructure and has responsibility for the network operation. The contact between the operator and customer is based on contracts including service level agreements. The wireless access network is typically operated in licensed bands, and the access equipment, i.e. base station, is typically not of consumer electronics type. A typical example is the family of products and network based on the Third Generation Partnership Project (3GPP) standard.

The distinction between user deployment and operator deployment becomes less clear with the introduction of new products, such home relays/repeaters and home base stations (HBS), also referred to as femto base stations or Home (e)NodeB (H(e)NB). These devices operate in licensed bands, often on the same carrier that is used by macro base stations for outdoor coverage. Nonetheless, the installation and exact placement of these devices are left to the customers, quite similar to the case of user deployed networks, and the operation of these devices is often shared between the customer and the macro base station operator.

As of today, devices like home base stations are not sold through retail markets as regular consumer products, but they may be purchased from the operators. Alternatively the operator is offering its customers leased or subsidized devices.

Home base stations or femtos are small base stations, typically designed for use in a home or small business. For a mobile network operator, the main attraction of the home base stations are improvements to both coverage and capacity, especially indoors, where some users may experience bad performance from the macro network.

These home base stations are operating in the licensed spectrum, using one of the typical mobile communications standards, such as Wideband Code Division Multiple Access (WCDMA), High Speed Packet Access (HSPA), Code Division Multiple Access (CDMA) 2000 or Worldwide Interoperability for Microwave Access (WiMax), and are currently under standardization for Long Term Evolution (LTE) in 3GPP.

The home base stations are not directly connected to the core network by means of a backhaul link which is part of the mobile network, but via a broadband connection, such as Digital Subscriber Line (DSL) or cable, in the home. Furthermore, the operator has only very limited control, if any at all, of where the home base station is installed inside the customer's premises, and of how the home base station is operated.

Two other traditional cellular indoor solutions are based on pico base stations and on distributed antenna systems, respectively. Pico base stations implement exactly the same interfaces, protocols, and algorithms as a macro base station, but has lower dimensions, lower transmitted power, and lower processing capabilities. The operator may deploy one or several pico base station(s) in a building, each of them providing service in a limited area.

Distributed antenna systems refer to a specific type of antenna system in which many antenna elements, e.g. radio heads, are connected to the same feeder but physically located in different places in a building. The feeder of this type of antenna system is connected to one or several base stations, typically located somewhere in the building.

From an architectural point of view, there is no difference between a pico base station, or a distributed antenna system, and a macro base station. They are all deployed and managed by the operator, and the connection to the wireless access network is done through backhaul connections installed and managed by the operator.

The deployment of home base stations should be performed in a way such that the quality of the mobile service provided to the customers is improved in the best possible way, but at a minimal cost for the mobile operator.

Since the home base stations are usually offered as a subsidized device, and therefore comes at a cost for the operator, the decision where to deploy home base stations is an important one.

There are two current deployment alternatives, in which the operator does not take an active role. In the first alternative, which is the one most commonly used today, the operator may passively sell or lease the home base stations to the customers interested in having them. In the second alternative, home base stations may be dispatched to those customers that contact the operator to complain about poor indoor services.

Although the home base station may function in open access mode, that is allowing user equipments to connect to it just like any macro base station, the main scenario considered for the home base station is to handle Closed Subscriber Groups (CSG). Thus, each home base station has configured a CSG, and access is granted only to user equipments belonging to this group.

One approach is to let the owner of the home base station configure the content of the CSG. Nonetheless, the home base station currently commercialized is remotely configured by the operator upon requests from the owner of the home base station. This means that the customer effectively has no control over the CSG content.

Relaying techniques may be used to boost the quality of the radio signal, for instance when the direct radio connection between the base station and the user equipment is too weak. The most common solution is to use analog Radio Frequency (RF) repeaters, which typically receive the signal with the help of an antenna, amplifies the signal and sends it from another antenna which is radio isolated from the first antenna. This solution may be used for providing indoor coverage, for instance by mounting one of the antennas outdoors, and the other one indoors.

More advanced solutions are decoding the received signal, re-encoding it and forwarding it. This allows for the signal to be forwarded on another logical channel, since the relaying device may implement advanced radio resource management algorithms. Furthermore, base stations may implement relaying techniques so that the base station may use its radio interface to connect to the access network, instead of using a wireline backhaul or a microwave link. In this case, the base station is routing its traffic through another base station, and a part of the spectrum is used for backhauling instead of being used in the direct connections with user equipments. This approach is also called "self-backhauling", or "in-band self-backhauling", in order to emphasize that the base station is not connected to the access network in the conventional way.

From a protocol point of view, this may be implemented in several ways, as illustrated in FIG. 1. The top drawing illustrates a case where no relaying technique is involved. One of the user equipments 105 is directly connected to base station A BS A 107, while the other user equipment 103 is out of coverage. The middle drawing shows a solution where the base station B BS B 109 forwards the control plane channels as well as the user plane channels, i.e., acts as a traditional repeater. Hence, the user equipment 105 is logically connected to base station A 107, the existence of base station B 109 is transparent to the user equipment 105, and in effect base station B 109 only extends the coverage of cell A 111. In other words, the user equipment 105 is logically connected to base station A 107, while base station B 109 extends the coverage of cell A 111 in a transparent mode. Another approach, shown in the bottom drawing, is to let base station A 107 forward the traffic between base station B 109 and the core network. Hence the user equipment 105 is logically connected to base station B 109, which creates a new cell B 112, distinct from cell A 111. In this case, the user equipment 105 has no logical interaction with base station A 107 and is not aware of the relaying connection between base station A 107 and base station B 109. In other words, the user equipment 105 is logically connected to base station B 109, which creates a new cell B 112, distinct from cell A 111.

Although the self-backhauling architecture and the necessary protocols have been considered in the 3GPP forum only for macro base station scenarios, the idea of letting home base stations use the self-backhauling concept to connect to the access network is known and has been discussed.

In a mobile network the operator is responsible for the services delivered to the customers. The operator continuously needs to monitor the performance of the network and the services running in the network. To achieve this, the operator may use a number of methods and tools.

Traditionally the performance of the network is monitored in terms of performance of network resources or network elements. Such analysis is usually based on network element counters, which gives statistics about the performance of each network element, e.g. carried load, Central Processing Unit (CPU) usage, handover failure ratio etc. Such performance counters may either be standardized or vendor proprietary. The time granularity of network element counters are usually in the order of 5-15 minutes, and the aggregation level is usually per cell or per base station in the case of a radio network element. The output of network counter monitoring may for example serve as decision basis for where to deploy a new macro base station due to identified capacity problems in specific areas.

Another method used for network performance monitoring is to use drive tests. In this setup, special purpose user equipments are used, which are programmed to test specific aspects of the mobile network and provide detailed reports on the performance including cell level location of the measurement. This way more detailed reports on cell level may be obtained for the cells that have been visited in the drive test, but due to its nature this method does not scale up very well to handle a large network. It also does not measure the performance of real users, but of the specific test user equipments and adds additional load to the network.

It was identified in WO 2005/032186 that performance monitoring based on network element counters is not enough to understand the user perceived end-to-end quality of packet switched services in mobile networks. The document presents a system in a mobile network for monitoring the user perceived quality for individual users in the network, based on correlating traffic and mobility information extracted from passively captured traces collected from multiple standardized interfaces. In this way the end-to-end performance of individual users may be detected in the network.

Another means of getting per-user performance information is the "Subscriber and Equipment Trace" functionality specified in 3GPP, which provides very detailed information at call level on one or more specific mobile(s). Contrary to network element counters, which are permanent sources of performance information, Trace is activated on user demand for a limited period of time for a specific analysis purpose.

In a mobile network operator that already has deployed base stations for outdoor coverage, without loss of generality in the following, the coverage may be assumed to be provided by macro base stations. The macro base stations provide limited coverage also for indoor users. For instance it may provide coverage for low data rate service, such as voice and Short Message Service (SMS), but not for wireless broadband connections. The operator may own or control a wired infrastructure for providing fixed broadband access (xDSL), such as twisted pair, e.g. phone line, TV coaxial cable, optical fiber etc.

In order to improve the performance of the mobile service, particularly to enhance the service quality provided for the indoor users, the operator intends to provide home base stations to its customers.

As explained above, there are two main deployment alternatives for home base stations today, but both of these come with drawbacks. First of all, offering home base stations to all the customers may not be a good approach, due to economic reasons, for instance because the operator is subsidizing these devices or because of lack of enough devices. So the first alternative may be a costly one for the operator, and one which does not necessarily improve the indoor quality where it is best needed, but is more likely to address early adopters that may or may not experience performance problems from the macro network.

The second alternative relies on the customer actively calling the operator to complain about the bad performance. This is a risky alternative for the operator, which may result in churn of those users who simply choose to switch operator instead.

It is clear that a different approach for home base station deployment is needed so as to better enhance the overall network performance for each delivered and/or subsidized home base station.

SUMMARY

An object of the present invention is to provide a mechanism for enabling improved network performance.

According to a first aspect of the invention, the objective problem is solved by a method in a communication network node for enabling improved communication performance for a user equipment in a communication network. The user equipment is connected to, i.e., served by, at least one base station. The at least one base station is connected to a core network of the wireless network. The core network is configured to provide communication services to the user equipment. In a first step, the communication network node detects that wireless communication performance between the user equipment and the at least one base station is poor. The communication network node identifies a location of the user equipment where the poor wireless performance is detected, and obtains an identity associated with the user equipment. Then, it obtains a home address associated with the user equipment based on the obtained identity. It is identified that the identified location of the user equipment is residential and that the home address corresponds to the identified location. Then, the communication network node searches for a wireline access connection located within a certain distance from the user equipment. The distance is such that a home base station, when connected to the wireline access connection, would be able to provide cellular network service coverage to the user equipment. The communication network node establishes whether the communication performance for the user equipment would be improved by providing communication services from the core network to the user equipment via the wireline access connection using the home base station.

According to a second aspect of the invention, the objective problem is solved by a communication network node for enabling improved communication performance for a user equipment in a communication network. The user equipment is connected to at least one base station serving the user equipment. The at least one base station is connected to a core network. The core network is configured to provide communication services to the user equipment. The communication network node comprises a detecting unit configured to detect that wireless communication performance between the user equipment and the at least one base station is poor. The communication network node also comprises an identifying unit configured to identify a location of the user equipment where the poor wireless performance is detected. The communication network node comprises an obtaining unit which is configured to obtain an identity associated with the user equipment and to obtain a home address associated with the user equipment based on the obtained identity. The identifying unit is further configured to identify that the identified location of the user equipment is residential and that the home address corresponds to the identified location. Further, the communication network node comprises a searching unit configured to search for a wireline access connection located within a certain distance from the user equipment. The distance is such that a home base station, when connected to the wireline access connection, would be able to provide cellular network service coverage to the user equipment. The communication network node comprises an establishing unit configured to establish whether the communication performance for the user equipment would be improved by providing communication services from the core network to the user equipment via the wireline access connection using the home base station.

Thanks to that the communication network node establishes whether a poor wireless communication performance between a user equipment and a base station would be improved by providing communication services from the core network to the user equipment via the wireline access connection using the home base station, a mechanism for enabling improved network performance is provided.

The present technology affords many advantages, for which a non-exhaustive list of examples follows:

An advantage of the present solution is that it is capable of handling a large number of customers, to which a home base station should be offered. The solution takes into account the quality of service of a cellular network, so as home base stations are offered for best improving the quality of the cellular network.

Another advantage is that the solution takes into account and exploits that an operator may own both a wireless, e.g.

cellular, access network and a wireline, e.g. broadband, access network, and that a person may be customer to both of these networks.

The solution enables an operator with both a wireless, e.g. cellular, and a wireline, e.g. broadband, access network to bundle services into one package, and to do this in a cost efficient way. This is particularly relevant if the operator subsidizes the deployment of home base stations.

The proposed solution also allows for an advantage of efficient roll-out of home base stations even in case the targeted customer does not have an active wireline connection yet. In the short run this increases the probability for the customer to accept the offer. In the long run it allows the operator to market a wireline connection as an upgrade of an existing package of services.

The present solution is not limited to the features and advantages mentioned above. A person skilled in the art will recognize additional features and advantages upon reading the following detailed description.

BRIEF DESCRIPTION OF THE DRAWINGS

The solution will now be further described in more detail in the following detailed description by reference to the appended drawings illustrating embodiments of the solution and in which.

The drawings are not necessarily to scale, emphasis is instead being placed upon illustrating the principle of the solution.

DETAILED DESCRIPTION

The present solution relates to mobile services provided by wireless cellular networks, and in particular to the way a network is deployed so as to ensure satisfactory quality of service. A home base station deployment decision is based on information from several sources. The decision procedure comprises the detection of a problem, such as bad coverage, poor network performance or low data-rates, which may be alleviated by installing a home base station. Information about the customers and about the availability of other type of infrastructure is also used in order to decide whether the deployment of a home base station is suitable, i.e. to identify the customer to whom the home base station may be delivered or offered so that the network performance would be improved.

Unlike an operator deployed network, particularly a case when the problem is solved by deploying a base station with large coverage, the operator must identify the specific customer that is likely to install the device. Therefore the traditional network planning procedures e.g. based on network element counters as described earlier, are not enough in this case. Moreover, due to the large number of cases and customers, this procedure is too time consuming and resource demanding using traditional involvement of a human, typically such as a network planning engineer.

Furthermore, the deployment of a home base station differs from the deployment of a pico base station in that the operator's staff installs the necessary backhaul connection for the pico base station. On the other hand, the successful deployment of a home base station relies on the existence of a functional wireline access point. This may not be available if a household has never been physically connected to a Public Switched Telephone Network (PSTN) or any other wireline service provider, or if it has canceled the contract with the wireline access.

The solution may be implemented as communication network node, such as for example a Home Base Station Deployment Manager. This may be a stand-alone server in the core network, or part of an existing Operations & Maintenance (O&M) subsystem.

Figure 1:
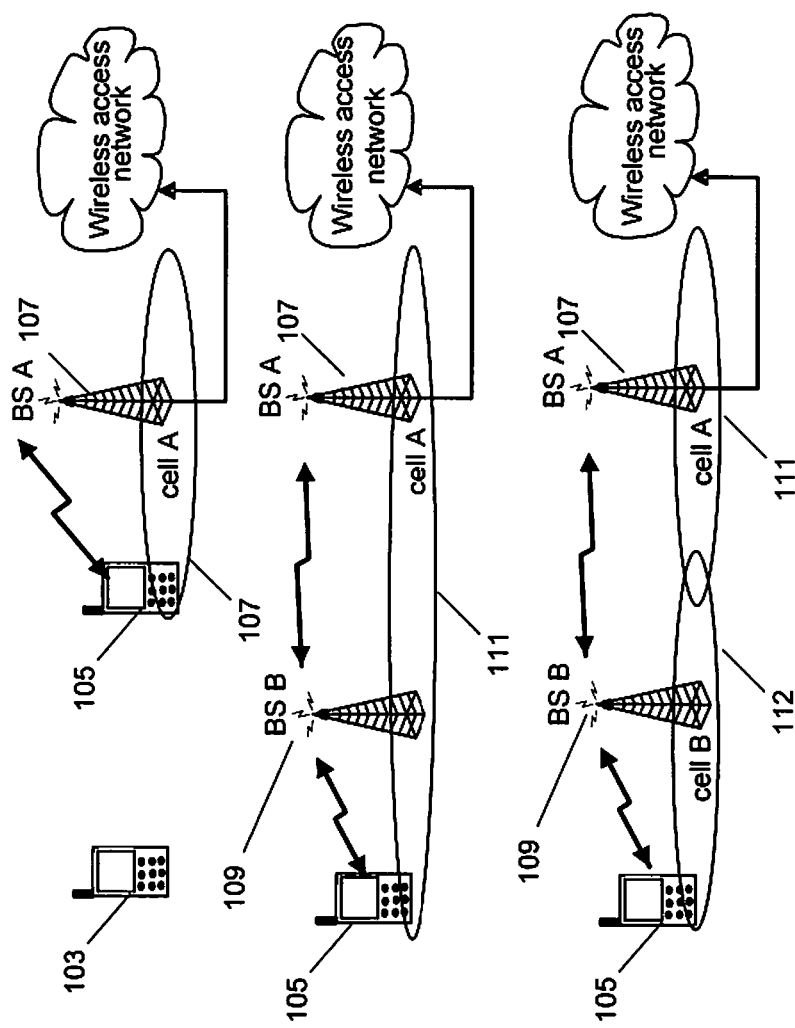
FIG. 1 is a schematic block diagram illustrating relaying techniques.
Figure 2:
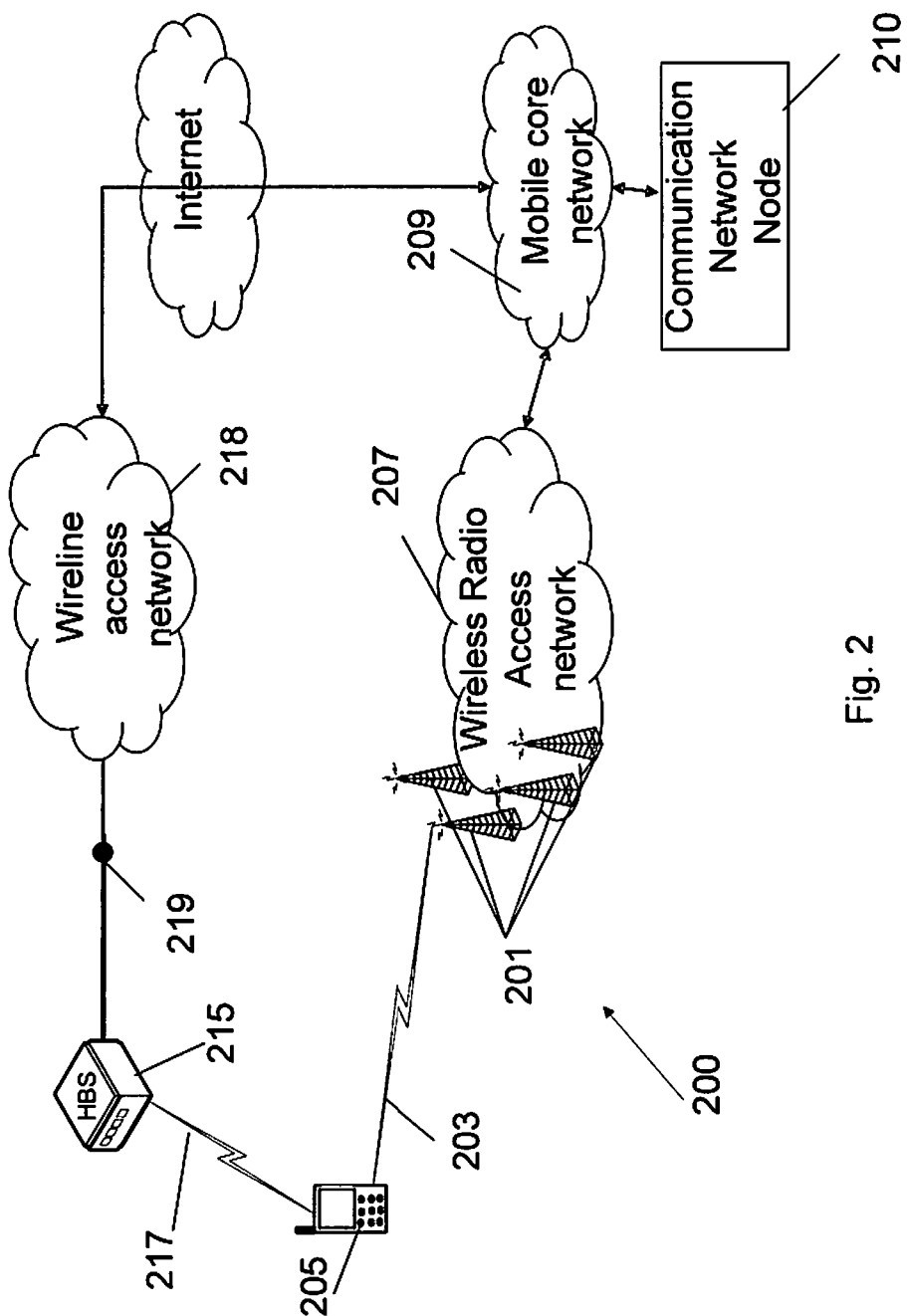
FIG. 2 is a schematic block diagram illustrating embodiments of a communication network.

FIG. 2 depicts a communication network 200. The communication network 200 may use a radio access technology such as for example LTE. The communication network 200 comprises at least one base station 201. The base station 201 may be a macro base station such as NodeB, evolved NodeB (eNB), or any other network unit capable to communicate over a radio channel 203 with a user equipment 205. The user equipment 205 may be any suitable communication device or computational device with communication capabilities, for instance but not limited to mobile phone, smart phone, PDA, laptop, MP3 player or portable Digital Versatile Disc (DVD) player or similar media content devices, digital camera, or even stationary devices such as a Personal Computer (PC). A PC may also be connected via the user equipment 205 as the end station of the broadcasted/multicasted media.

The base station(s) 201 is connected, via a wireless radio access network 207, to a mobile core network 209 providing mobile services to the user equipment 205.

It should be appreciated that the communication network 200 is configured with cabling, routers, switches, and other network building elements (not shown) as understood by the skilled person, for instance as used for building an Ethernet or Wide Area Network (WAN) network.

The communication network 200 further comprises a communication network node 210 connected to the mobile core network 209. The following procedure may be implemented in the communication network node 210 by means of e.g. a "Home Base Station Deployment Manager". This communication network node 210 may have logical interfaces toward several units in the mobile operator's core network 209, and also toward databases related to the existing infrastructure for wireline services. For instance, it may be placed in the operator's core network 209. It may also be implemented as a feature in the Operation and Maintenance subsystem in the operator's network 209.

A Home Base Station (HBS) 215 may be connected to the user equipment 205 using a wireless link 217. The home base station 215 is referred to as HBS in some of the drawings. The home base station 215 may be connected to a wireline access network 218 through a physical wired connection 219. The wired connection 219 could provide for instance a DSL service. The home base station 215 may use the communication services provided by the wireline access network 218 to establish a logical connection to the mobile core network 209. Hence, the home base station 215 may provide core network services for the user equipment 205 by tunneling the user and the control data through the wireline access network 218, and other means of inter network communication such as Internet.

Figure 3:
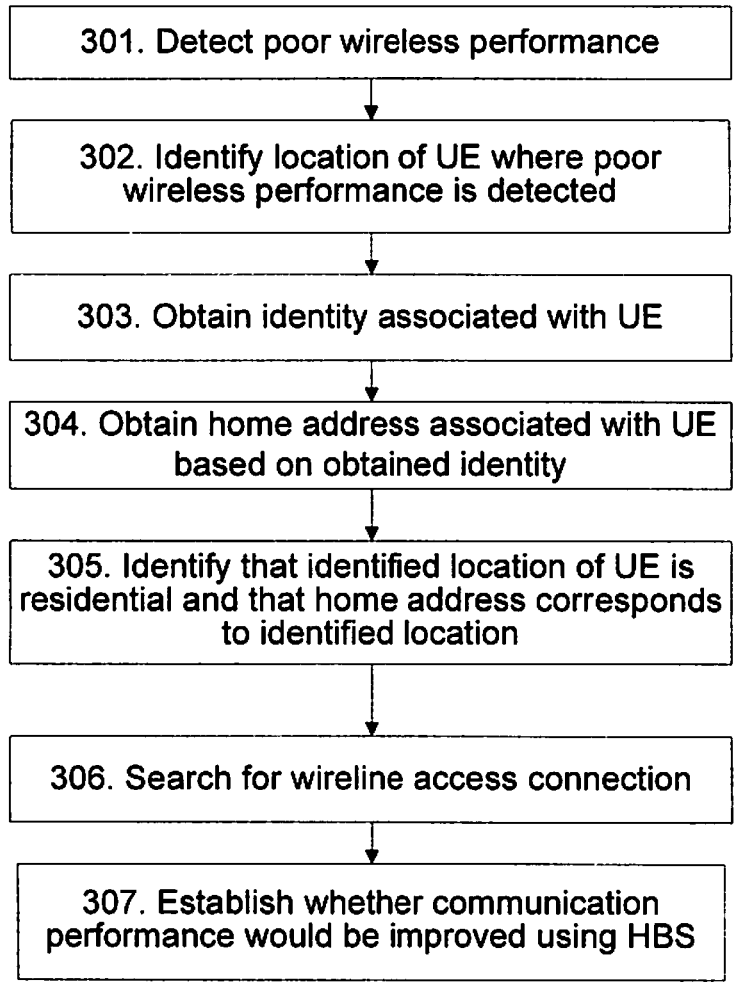
FIG. 3 is a flow diagram illustrating embodiments of a method in a communication network node in general.

The general procedure of the solution method is illustrated in FIG. 3. The method enables improved communication performance for the user equipment 205 in the communication network 200. As mentioned above, the user equipment 205 is connected to at least one base station 201 serving the user equipment 205. The at least one base station 201 is connected to a core network 209. The core network 209 is configured to provide communication services to the user equipment 205. The method steps below are described with reference to FIG. 3, but will be discussed more in detail with reference to FIG. 6. The method comprises the following steps to be performed in any suitable order as understood by the person skilled in the art:

Step 301

The communication network node 210 detects that wireless communication performance between the user equipment 205 and at least one base station 201 is poor.

Step 302

The communication network node 210 identifies a location of the user equipment 205 where the poor wireless performance is detected.

Step 303

The communication network node 210 obtains an identity associated with the user equipment 205.

Step 304

The communication network node 210 obtains a home address associated with the user equipment 205 based on the obtained identity.

Step 305

The communication network node 210 identifies that the identified location of the user equipment 205 is residential and that the home address corresponds to the identified location.

Step 306

The communication network node 210 searches for a wireline access connection 219 located within a certain distance from the user equipment 205. The distance is such that a home base station 215, when connected to the wireline access connection 219, would be able to provide cellular network service coverage to the user equipment 205.

Step 307

The communication network node 210 establishes whether the communication performance for the user equipment 205 would be improved by providing communication services from the core network 209 to the user equipment 205 via the wireline access connection 219 using the home base station 215.

Figure 4:
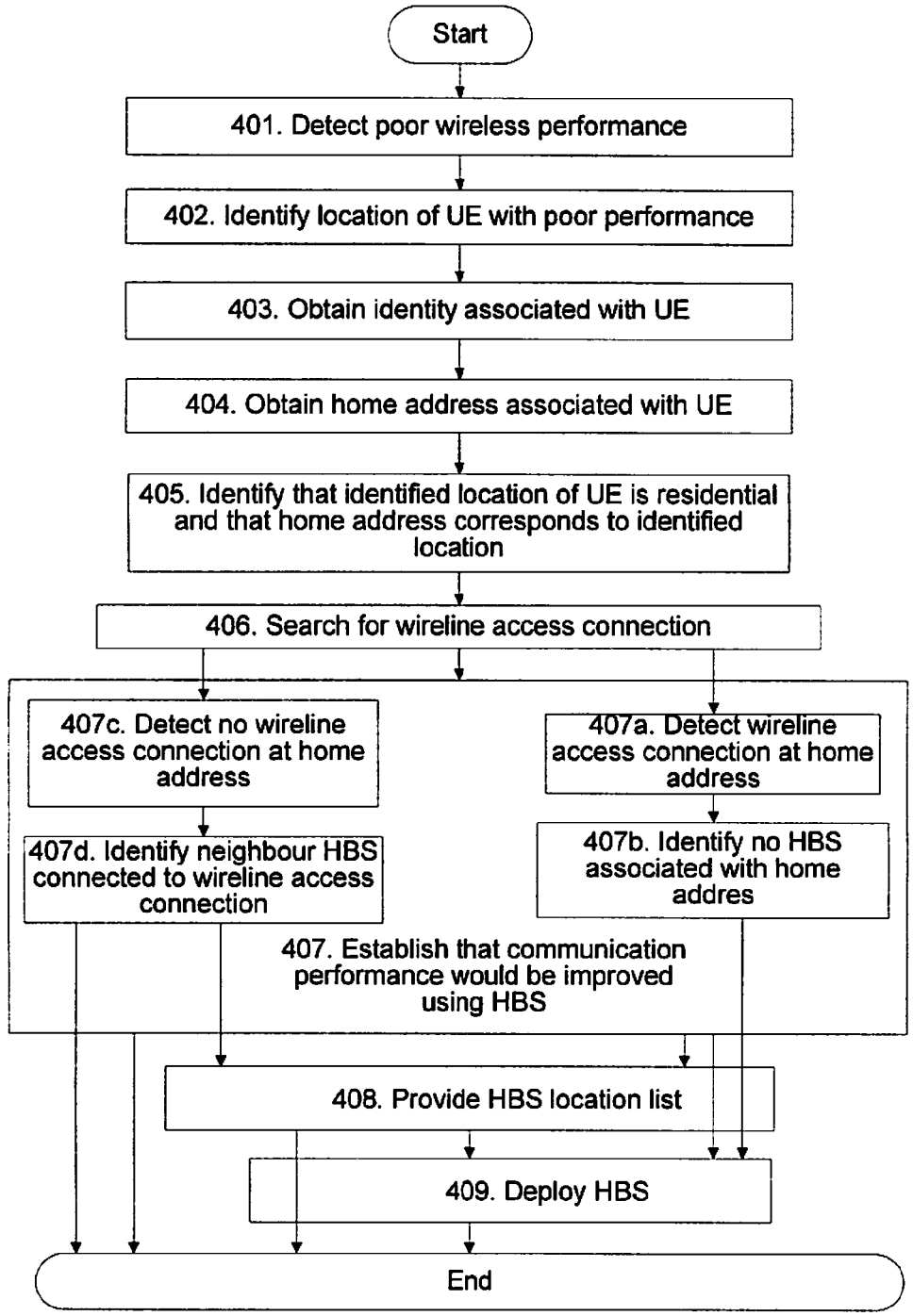
FIG. 4 is a flow diagram illustrating embodiments of a method in a communication network node in detail.

The method described above will now be described in more detail and seen from the perspective of the communication network node 210. FIG. 4 is a flowchart describing embodiments of the present method in the communication network node 210, for enabling improved communication performance for a user equipment 205 in a communication network 200. The user equipment 205 is connected to at least one base station 201 serving the user equipment 205. The base station 201 is connected to a core network 209. The core network 209 is configured to provide communication services to the user equipment 205. The communication network node 210 may be a home base station deployment manager or a stand-alone server or a part of an O&M-subsystem. The method comprises the steps to be performed in the communication network node 210:

Step 401

This is similar to step 301 in FIG. 3. The communication network node 210 detects that wireless network performance between the user equipment 205 and the at least one base station 201 is poor.

Step 402

This is similar to step 302 in FIG. 3. The communication network node 210 identifies a location of the user equipment 205 where the poor wireless performance is detected.

Step 403

This is similar to step 303 in FIG. 3. The communication network node 210 obtains an identity associated with the user equipment 205. In some embodiments, the obtaining of the identity associated with the user equipment 205 is based on international mobile subscriber identity, "IMSI".

Step 404

This is similar to step 304 in FIG. 3. The communication network node 210 obtains a home address associated with the user equipment 205 based on the obtained identity. In some embodiments, the obtaining of the home address of the user equipment 205 is based on international mobile subscriber identity, "IMSI".

Step 405

This is similar to step 305 in FIG. 3. The communication network node 210 identifies that the identified location of the user equipment 205 is residential and that the home address corresponds to the identified location. If the identified location is not residential, then the procedure is stopped.

Step 406

This is similar to step 306 in FIG. 3. The communication network node 210 searches for a wireline access connection 219 located within a certain distance from the user equipment 205. The distance is such that a home base station 201, when connected to the wireline access connection 219, would be able to provide cellular network service coverage to the user equipment 205. In some embodiments, the communication network node 210 has information about a maximum coverage of a home base station stored in for example a memory of the communication network node 210. This home base station coverage information may be provided by the provider of the communication network node 210 or loaded into the communication network node by the operator of the home base stations. This information helps the communication network node 210 to know in which distance to search for the wireline access connection 219.

Step 407

This is similar to step 307 in FIG. 3. The communication network node 210 establishes that the communication performance for the user equipment 205 would be improved by providing communication services from the core network 209 to the user equipment 205 via the wireline access connection 219 using the home base station 215. This step may be performed in different ways, as described as sub steps 407a-b or as sub steps 407c-d below.

Step 407a

This is a sub step of step 407, and illustrates an embodiment of how the communication network node 210 may establish that the communication performance for the user equipment 205 would be performed. The communication network node 210 may detect a wireline access connection 219 located at the home address.

Step 407b

This is a sub step of step 407 which is performed after sub step 407a. The communication network node 210 may identify that there is no home base station 215 associated with the home address.

Step 407c

This is a sub step of step 407, and illustrates another alternative embodiment of how the communication network node 210 may establish that the communication performance for the user equipment 205 would be performed. In this embodiment, the communication network node 210 detects that there is no wireline access connection 219 located at the home address Step 407d This is a sub step of step 407 which is performed after sub step 407c. In the alternative embodiment, the communication network node 210 may identify that a neighbour home base station 215 is connected to the wireline access connection 219. In this case, the wireline access connection 219 is not located at the home address, as detected in step 407a, but at e.g. a neighbour location. This means that the home base station 215 is also located at the same place as the wireline access connection 219, i.e. at a neighbour location.

Step 408

This is an optional step. In some embodiments, the communication network node 215 may provide a list of possible home base station deployment locations. The list may be based on the identified location, the obtained identity, the obtained home address, the searched wireline access connection and the established improved performance.

Step 409

This is an optional step which may be performed as an alternative to step 408, or after step 408. In some embodiments, a home base station 215 is deployed at the home address. The home base station 215 may be connected to the neighbour home base station.

Figure 5:
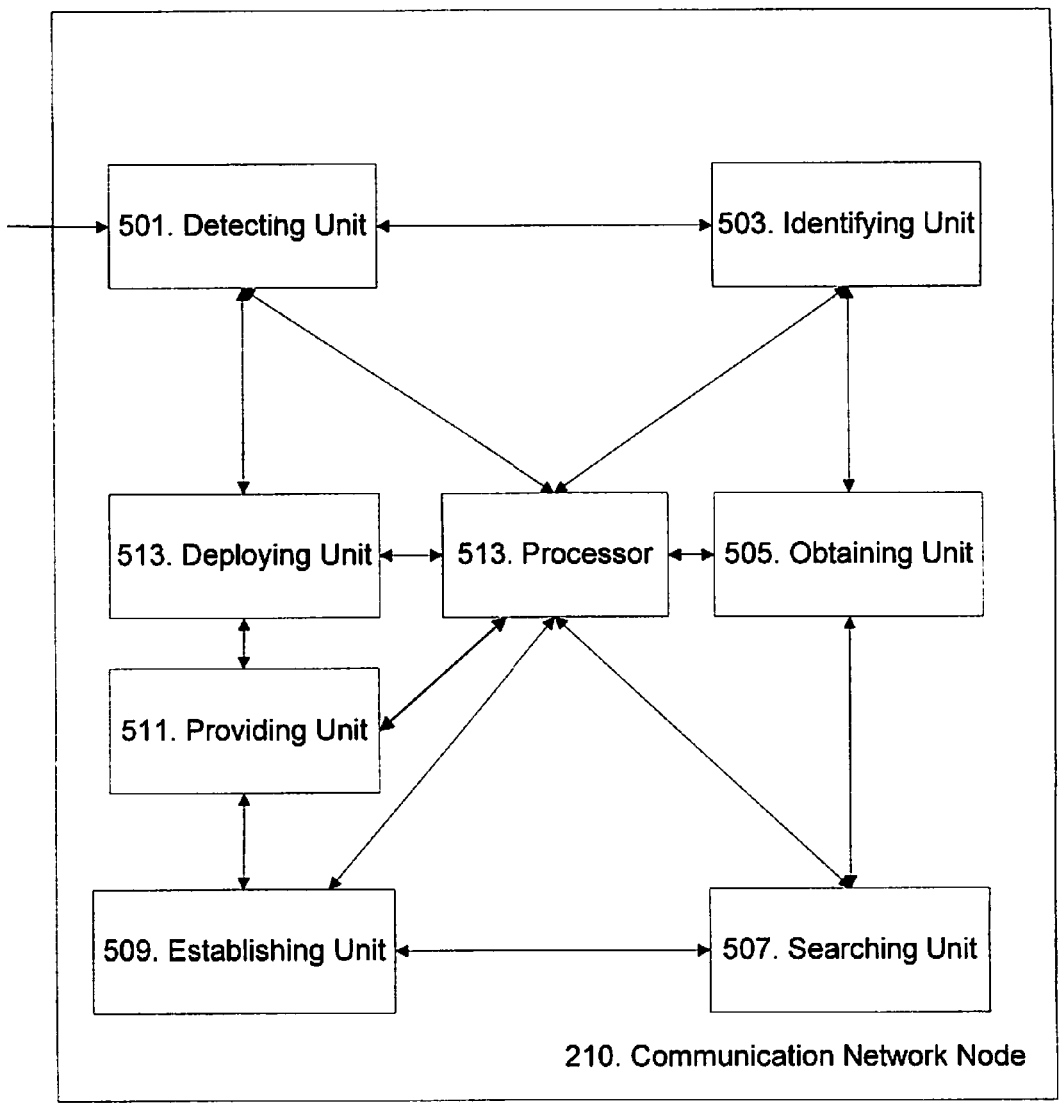
FIG. 5 is a schematic block diagram illustrating embodiments of a communication network node.

To perform the method steps shown in FIG. 4 for enabling improved communication performance for user equipment 205 in a communication network, the communication network node 210 comprises a communication network node arrangement as shown in FIG. 5. As mentioned above, the user equipment 205 is connected to at least one base station 201 serving the user equipment 205. The at least one base station 201 is connected to a core network 209. The core network 209 is configured to provide communication services to the user equipment 205. The communication network node 210 may be a home base station deployment manager or a stand-alone server or a part of an O&M-subsystem.

The communication network node 210 comprises a detecting unit 501 configured to detect that the wireless communication performance between the user equipment 205 and the base station 201 is poor.

The communication network node comprises an identifying unit 503 which is configured to identify a location of the user equipment 205 where the poor wireless performance is detected. The identifying unit 503 is further configured to identify that the identified location of the user equipment 205 is residential and that the home address corresponds to the identified location.

The communication network node 210 comprises an obtaining unit 505 configured to obtain an identity associated with the user equipment 205, and to obtain a home address associated with the user equipment 205 based on the obtained identity. Obtaining the home address of the user equipment 205 and obtaining the identity of the user equipment 205 may be based on international mobile subscriber identity, "IMSI".

Further, the communication network node 210 comprises a searching unit 507 configured to search for a wireline access connection 219 located within a certain distance from the user equipment 205. The distance is such that a home base station 215, when connected to the wireline access connection 219, would be able to provide cellular network service coverage to the user equipment 205. The home base station 215 may connected to a neighbour home base station.

The communication network node 210 comprises an establishing unit 509 configured to establish that the communication performance for the user equipment 205 would be improved by providing communication services from the core network 209 to the user equipment 205 via the wireline access connection 219 using the home base station 215. The establishing unit 509 may be further configured to detect a wireline access connection 219 located at the home address, and to identify that there is no home base station 215 associated with the home address. The establishing unit 509 may even further be configured to detect that there is no wireline access connection 215 located at the home address, and to identify that a neighbour home base station may be connected to the wireline access connection 219.

The communication network node 210 may comprise a providing unit 511 configured to provide a list of possible home base station locations.

The communication network node 210 may comprise a deploying unit 513 configured to deploy a home base station 215 at the home address. The deployment of the home base station 215 may be based on the list provided by the providing unit 511.

Figure 6:
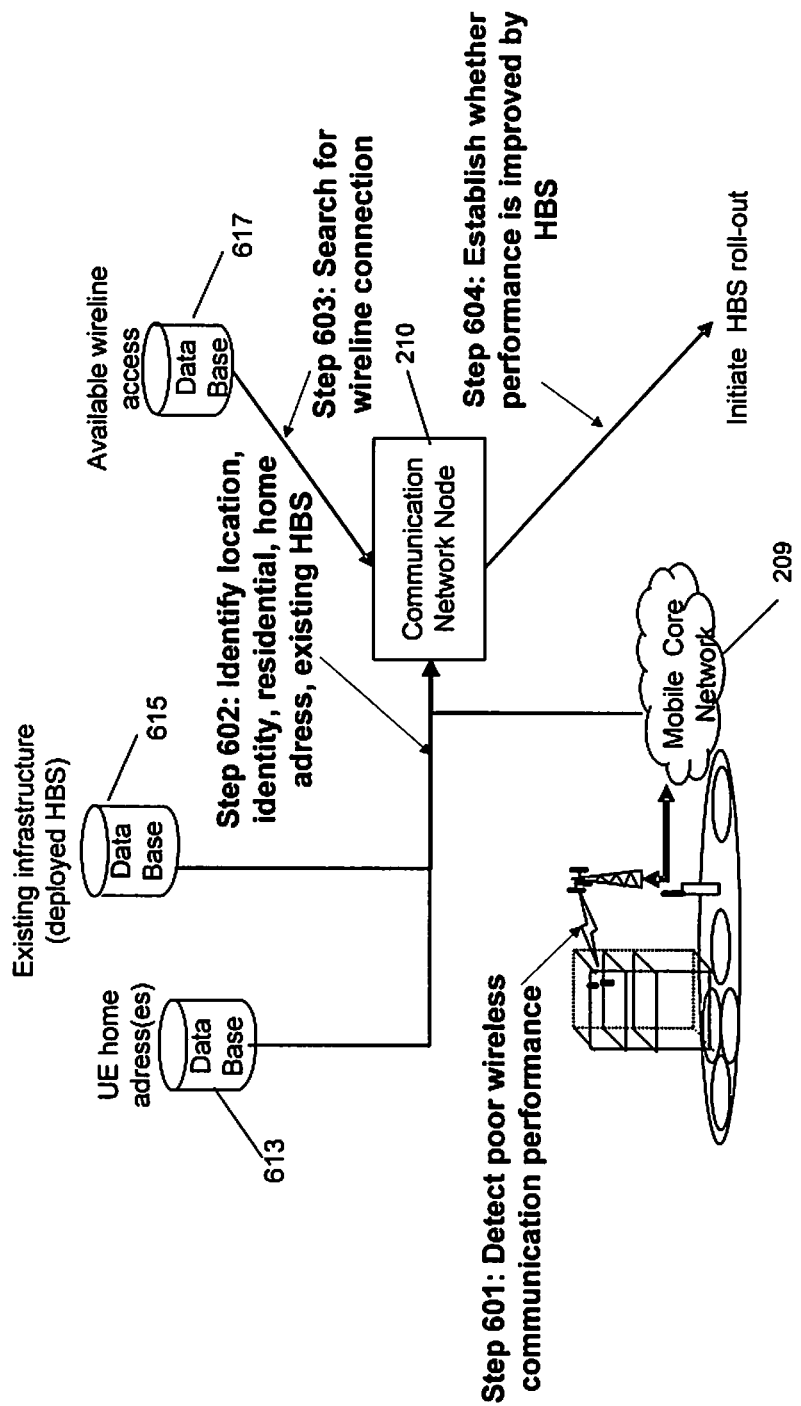
FIG. 6 is a schematic block diagram illustrating embodiments of a method.

The present solution will now be discussed more in detail referring to a first example embodiment. The architecture of a first embodiment is illustrated in FIG. 6. The communication network node 210 may have interfaces towards databases and other subsystems, related to the cellular network, the existing infrastructure for wireline services, and to the customers with both mobile and wireline subscriptions. The first embodiment comprises the following steps, illustrated in FIG. 6 and FIG. 2.

Step 601

This corresponds to the general steps 301 and 401 above. The communication network node 210 detects poor wireless performance of the communication between the user equipment 205 and the at least one base station 201. The poor wireless performance may be alleviated by installing a home base station 215. The poor performance may be due to that links to all available base stations 201 are poor. Moreover, the poor performance may also be that the user equipment 205 experiences poor service quality, which may be due to congestion in the backhaul. This means that the service is poor even if the wireless communication is in fact good. The communication network node 210 may perform the detection with any of the prior art methods, such as network element counters, drive tests, equipment traces, key performance indicators implemented in the radio network or in the Management and Operation subsystem, or any combination of these methods.

Step 602

This corresponds to the general steps 302-305 and 402-405, 407b and 407d above. The communication network node 210 identifies a location of the user equipment 205 where the poor wireless performance is detected, it obtains an identity associated with the user equipment 205 and obtains a home address associated with the user equipment 205 based on the obtained identity. The communication network node 210 identifies whether the identified location of the user equipment 205 is residential and whether the home address corresponds to the identified location. It also identifies whether there is a home base station 215 associated with the home address. In other words, the step identifies the customers to whom the home base station should 215 be delivered or offered so that the network performance is improved, i.e. whether deployment of a home base station 215 is an "open" solution to the detected problem. The communication network node 210 may perform this by creating a list of candidate customers to which a home base station 215 may be offered and/or dispatched within the location where the poor performance is detected. Such a list may be connected to a database comprising user equipment home address(es) 613 and a database comprising existing infrastructure 615, i.e. deployed home base station 215. For instance, if the problem area is not located in a residential area, or if the customer has already received a home base station 215, then a home base station 215 is not an open solution.

Step 603

This corresponds to the general steps 306 and 406 above. The communication network node 210 searches for a wireline access connection 219 located within a certain distance from the user equipment 205. The distance is such that a home base station 215, when connected to the wireline access connection 219, would be able to provide cellular network service coverage to the user equipment 205.

In other words, the communication network node 210 determines whether the home base station 215 is a feasible solution to the problem from the point of view of existing fixed wired infrastructure, i.e. existing wireline access connections. This reduces the list of candidate customers by removing those that do not qualify from this point of view. For instance, if there is no wireline infrastructure available in the problem area, the home base station 215 is not a feasible solution. This may be done by using a database comprising available wireline access connections 617.

Step 604

This corresponds to the general steps 307 and 407 above. The communication network node 210 establishes whether the communication performance for the user equipment 205 would be improved by providing communication services from the core network 209 to the user equipment 205 via the wireline access connection 219 using the home base station 215, and it may deploy a home base station 215 at the home address or provide a list of possible home base station locations.

For example, the customer(s) on the reduced candidate customer list is contacted, providing the customer with an offer for the home base station 215 and/or dispatch the home base station 215. The dispatch of the home base station 215 will improve the service of the user equipments 205.

Below, two further embodiments, the second and the third embodiment illustrate examples for enabling improved network performance for a user equipment 205 in a communication network 200 will be described to illustrate the method. The main distinction between these two embodiments is the degree of control the operator may have upon the deployed device, i.e. the home base station 215. In the second exemplary embodiment, the customer is assumed to have full and sole control of the home base station 215, particularly in terms of selecting which user equipments are allowed to be connected to, i.e. through, the home base station 215. This embodiment follows the current spirit of the home eNodeB standardization efforts within 3GPP. In the third embodiment the operator is assumed to have the right and possibility to modify the list of devices allowed to be connected to (through) the home base station 215.

This procedure is implemented in the communication network node 210, which may be referred to as a "Home Base Station Deployment Manager". This communication network node 210 may have logical interfaces towards several units in the mobile operator's core network, and also towards databases related to the existing infrastructure for wireline services, such as the databases for customer home addresses, existing infrastructure and available wire access. For instance it may be placed in the operator's core network. It may also be implemented as a feature in the Operation and Maintenance subsystem in the operator's network.

Second Embodiment

The procedure described in the second embodiment is initiated in a first step by that the communication network node 210 illustrated in FIG. 2, detects poor wireless communication performance, which refers to step 301 in FIG. 3, step 401 in FIG. 4 and step 601 in FIG. 6. The poor performance may be due to poor radio conditions such a weak received signal or strong interference from other cells than the serving one, it may be due to lack of capacity in the serving cell, e.g., too many user equipments 205 sharing the same radio resources, it may be due to backhaul limitations, etc. In both cases the location or apartment where the poor network performance is detected, has a wireline connection 219, which may be used for backhauling a home base station 215. Also, as mentioned earlier, the poor performance may be due to that links to all available base stations 201 are poor. Moreover, the poor performance may also be that the user equipment 205 experiences poor service quality, which may be due to congestion in the backhaul. This means that the service is poor even if the wireless communication is in fact good.

The communication network node 210 may perform the detection with any of the prior art methods, such as network element counters, drive tests, equipment traces, key performance indicators implemented in the radio network or in the Management and Operation subsystem, or any combination of these methods. Regardless how the detection is implemented, it represents the first step of this second embodiment.

In a second step, which refers to steps 302-305 in FIG. 3, steps 402-405, 407b and 407d in FIG. 4 and step 602 in FIG. 6, the communication network node 210 decides whether the home base station 215 is an open solution to the detected problem. This means finding whether the problem area is in a residential area, for instance an apartment, and whether the residential area corresponds to the home of a customer connected to the user equipment 205 having the problem and to which a home base station 215 should be offered. More exactly, this means identifying one or several triplets of the form:

a) Problem area location.
  b) Identity of the customer associated with the user equipment 205 that should be offered the home base station 215 in order to improve the situation.
  c) The residential address of the person associated with the user equipment 205.

As alternative, these triplets may be extended by associating a "false alarm probability", i.e., numeric value between 0 and 1 indicating the accuracy with which the problem area has been identified.

The communication network node 210 may find the problem area by correlating measurements of radio network parameters, e.g., RxQual in GSM, transmitted power in a WCDMA network, CQI measurements in HSPA/LTE, time-advance measurements, reports, or estimates, etc. with position estimates. Any of the prior art algorithms for localization of user equipment 205, for instance triangulation, may be used to estimate the position. The ability to exactly locate the problem area is not essential, but it would simplify the implementation of the second step. If the estimated problem area is outdoors, or if the location is within a public building, then the installation of a home base station 215 would not be a solution.

Once the problem area is detected to be residential, the communication network node 210 may extract the identity and the residential location of the customer associated with the user equipment 205 experiencing poor wireless communication performance based on the IMSI. This may be done for instance by extracting the identity from the operator's customer database. In order to improve the accuracy of the procedure, the customer identity and the residential address are extracted only if the measurements associated with an IMSI are coming from the same place for a long period of time, for instance during the night, over several days. Instead, a high false alarm probability is associated with the cases when poor wireless communication measurements are reported from the same user equipment 205 during a short or an irregular period of time. In order to protect the privacy of the customers, triplets with high alarm probability may be discarded. For similar reasons, the triplets may also be discarded when the measurement location and the residential address do not match.

Once the match between the problem area, the identity of the mobile service customer, and the customer's residential address has been established, the home base station 215 will remain an open solution if the original Quality of Service problem can be solved by deploying the home base station 215. The first straightforward approach is that the communication network node 210 queries a database with already deployed home base stations 215. If a home base station 215 has already been dispatched to an address it may indicate that either the location of the problem has been wrongly identified, or that the dispatched home base station 215 has not been properly installed or operated, or that the type of problem experienced at that location may not be solved by deploying a home base station. Therefore those candidate triples whose addresses are listed in the database of already deployed home base stations may be removed from the candidate list.

Other prior art procedures for predicting the quality of service may be employed as well. For instance, if the data rates provided by the fixed internet connection at the residential area are lower than the data rates provided by the macro base station layer, then the deployment of a home base station will not boost the data rate of the user equipment 205, i.e., will not improve the network performance. Furthermore, if the user equipments located at neighbor locations are experiencing high downlink interference, then the deployment of a home base station 215 with closed subscriber group would further deteriorate the quality of service in those neighboring apartments. Hence the deployment of a home base station 215 would not be suitable in these cases. On the other hand, the deployment of a home base station 215 may be suitable if the macro base station layer is capacity congested, e.g., has a lower backhaul data rate than what the radio interface can handle, or large scheduling queues etc because some of the data traffic may be routed through the home base station 215 instead.

The exact definition of the performance measure criterion and the exact method used by the communication network node 210 to monitor and predict how the performance measure is modified as result of deploying a home base station 215 may be any prior art methods. Furthermore, this functionality may be provided by the O&S system, or a specialized functionality implemented in the home base station 215. Nonetheless, it may be advantageous that a prediction of the performance measure is done by the communication network node 210, so as to avoid dispatching a home base station 215 to an address where it would not lead to improvements.

Furthermore, in case there are several addresses where home base stations 215 may be dispatched, then the predicted improvement may be used to prioritize among the addresses and/or select the address for which the deployment of a home base station 215 would best improve the performance measure.

In the third step, which refers to step 306 in FIG. 3, step 406 in FIG. 4 and step 603 in FIG. 6, the triplets with low false alarm probability are candidates for the home base station 215 deployment, and are used as input to the third step in the proposed solution procedure. Since some of these candidate locations may be unfeasible for the deployment of a home base station 215, the third step is identifying and removing the unfeasible triplets.

For example, it may be assumed that two triplets correspond to two apartments that have equally poor coverage and that the user equipments 205 experiencing poor quality of service in these apartments have been identified as residents in those respective apartments with low false alarm probability. The deployment of a home base station 215 in any of these two apartments would improve equally much the network performance. So, seen purely from a radio perspective, it would not matter which of these two apartments the home base station 215 is dispatched to. However, if one of the apartments already has a subscription for (fixed) broadband services with the same operator that provides mobile services, while the other apartment has no such subscription, then, from the available infrastructure point of view, it is better to dispatch the home base station 215 to the first apartment.

In order to solve this problem, the communication network node 210 uses the identity of the mobile subscription customer in order to search in a database with (fixed) wireline service subscriptions 617. If the customer associated with a candidate triplet is also a fixed service customer, and if the problem location indicated in the triplet is the same as the address where the fixed services are provided, then this triplet is handled with high priority. For the sake of simplicity, in this second exemplary embodiment the communication network node 210 removes the triplet from the candidate list if the mobile service customer is not also a fixed service customer. Nonetheless, other embodiments may be considered too, such as maintaining the triplets on the list but with lower priority, identifying other customers of fixed services homed at the same address, for instance, it might be possible for another member of the family to own the subscription for the fixed services etc.

At the end of the third step, a list of candidate locations, identified by the name of the subscription holder and the address, is available for the communication network node 210. In the spirit of this embodiment, the list may be priority sorted, depending on the severity of the cellular service problem, the probability for false alarm, etc.

The last and fourth step, which refers to step 408-409 in FIG. 4 and step 604 in FIG. 6, in this procedure is to deploy a home base station 215 at the home address, i.e. to dispatch a home base station 215 to the customer on the list. This may be done by dispatching a personalized offer to the customers on this list, according to a known marketing and customer contact procedure. For instance, the customer may be offered a bundled subscription, including the wireline service, the cellular wireless services, dispatch of the home base station 215, and some suitable pricing for the package.

Third Embodiment

Proceeding to the third embodiment. The third example embodiment differs in two aspects from the one addressed by the previous second embodiment. It is assumed that the location, e.g. the apartment, experiencing poor wireless communication performance, i.e. poor coverage between the user equipment 205 and the base station 201, has no subscription to the wireline service offered by the operator. For instance the household may lack a physical connection to a wireline infrastructure, for example a broadband wireline infrastructure, or it may have deactivated the wireline connection, or it may have a subscription with another provider of wireline services.

Home base stations are in general assumed to implement a self-backhauling feature, similar to the one currently being standardized for macro base stations.

The first two steps, corresponding to steps 601 and 602 in FIG. 6, of this third exemplary embodiment are identical with the first two steps in the second example embodiment: the communication network node 210 uses a method known as prior art to detect that poor wireless communication performance is experienced somewhere in the communication network 200, an indoor location is identified, and the customer resident at that location is identified according to the method described earlier in this disclosure.

The third step, which corresponds to step 603 in FIG. 6, of this third embodiment is the same as in the previous second embodiment if the query addressed to the database of existing wireline infrastructure 617 shows to the communication network node 210 that the identified customer is also a wireline service customer. However, if the query to the database with existing wireline infrastructure and customers does not result in a hit on the identified customer, then the following procedure is followed.

Figure 7:
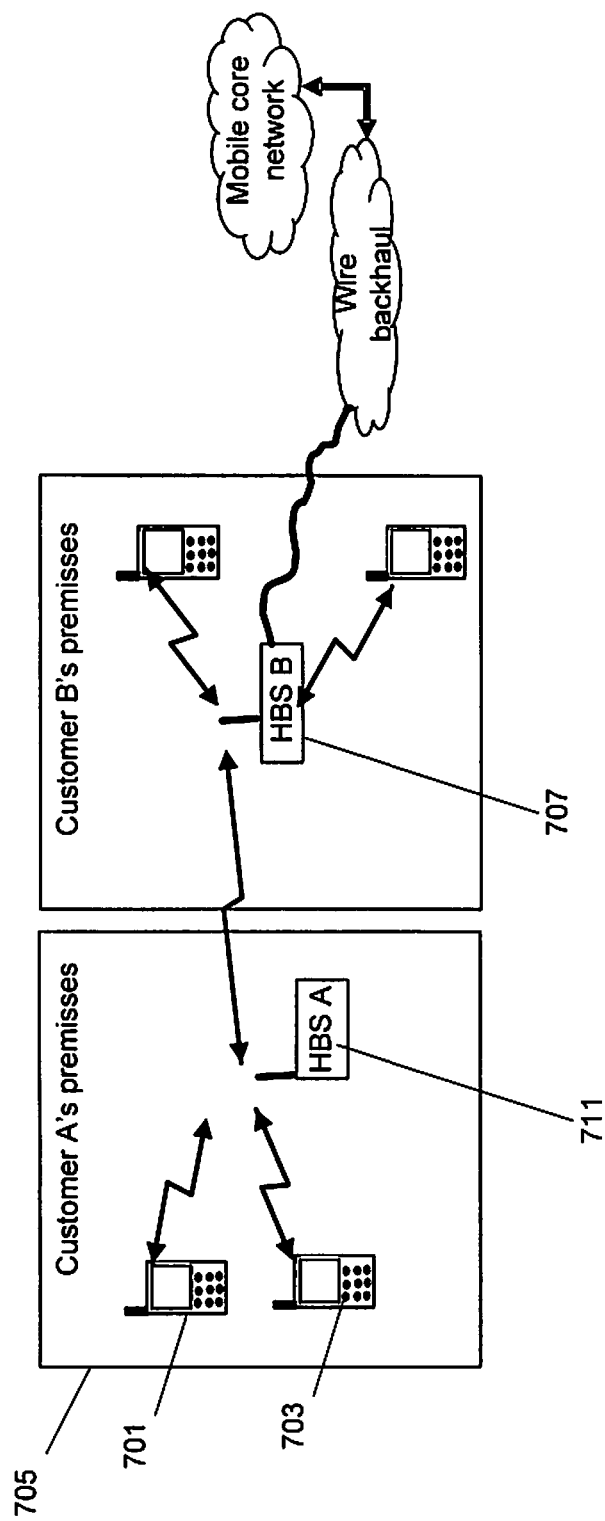
FIG. 7 is a schematic block diagram illustrating embodiments of a method for deploying a home base station as a relay.

The idea is to try to deploy a home base station with self-backhauling features, which may route its data to another base station, i.e. to deploy the home base station 215 as a relay as shown in FIG. 7. FIG. 7 will be described in more detail later. In order to do this, another base station which may act as an access point or anchor must be identified by the communication network node 210. This anchor base station may be an outdoor base station, for instance a macro base station, or it may be another home base station. In order to identify a potential outdoor anchor base station, any prior art method for monitoring the network performance may be used by the communication network node 210, for instance based on the ability of user equipments to detect base stations, perform measurements and report measurements related to these base stations.

Figure 8:
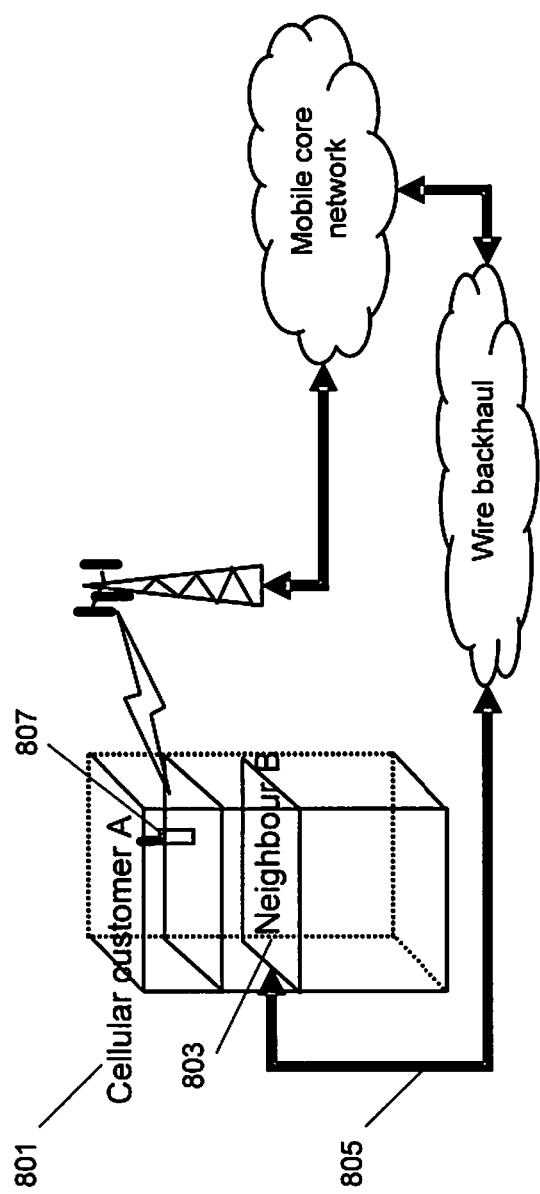
FIG. 8 is a schematic block diagram illustrating embodiments of a method using self-backhauling technique.

In order to identify potential anchors among the existing home base stations, the communication network node 210 may make a new query in the database of already deployed home base stations 315, using neighboring addresses in the query, for instance other apartments in the same high rise building. This scenario is illustrated in FIG. 8, where customer A 801 has poor wireless communication performance and no wireline access connection subscription, but neighbor B 803 has a wireline access connection subscription 805. For the sake of simplicity, this example illustrates only one neighbor B 803, however the idea applies also in the case when there are several neighbors with wireline access connections 805.

The trivial approach in this case would be to let a home base station installed in the apartment of customer B 803 serve also the apartment of customer A 801. This may be done for instance by including the identity of customer A's user equipment 807 into the Closed Subscriber Group (CSG) list of customer's B home base station. This operation would be a straightforward extension of how an open access base station works. However, this approach would not give customer A 801 the possibility to configure which other user equipments can be granted access through the home base station 215. Moreover, it would not give the operator to customize the services offered the customer A 801 and customer B 803. For these reasons as well as other reasons, the trivial approach is not a satisfactory solution.

If the search for potential anchor base stations yields several base stations, including both outdoor and indoor base stations, then the options which are less likely to improve the network performance are removed. For instance, if the poor wireless communication performance is due to congestion of the macro base station, and not due to poor link budget, then the macro base station may be disregarded as anchor. The following steps refer to the case of using a home base station as anchor.

The solution is to deploy a home base station 215 at customer A's apartment and let it connect to neighbor B's wireline connection 219 by means of a self-backhauling technique. The physical architecture of this solution is illustrated in FIG. 7. The deployment solution comprises the following steps:

1) The communication network node 210 may query the database of existing home base stations 615 so as to find at least one neighbor that has a wireline subscription and a home base station.
2) The communication network node 210 may instruct the user equipments 701, 703 of customer A 705 through the macro base station layer to perform measurements on the neighboring home base station B 707. The measurements may be collected by the communication network node 210 and used to estimate the quality of the wireless backhaul connection between a home base station A 711 deployed by customer A 705 and the neighboring home base stations 707. It may also estimate the quality of service provided by a backhauled base station, taking into account that the self-backhauled base station may be connected to more than one anchor base station.
3) If the estimated quality is high enough, a home base station 215,711 may be offered to customer A 705.

This requires that a home base station 215,711 implements a self-backhauling feature, so as to be able to use the same radio interface for wireless backhaul and for the direct connection to user equipments 205. As mentioned in the introduction, relaying in general and self-backhauling in particular are known techniques currently being considered for 3GPP standardization.

This also requires that a home base station 215,707 accepts other home base stations to connect to it. Since the self-backhauling home base station, i.e. customer A's home base station 711, behaves as a user equipment with respect to the anchor home base station, i.e. customer B's home base station 707 in this example, a solution may be to extend the CSG list so that it may comprise home base station identities as well.

The mobile network operator may remotely add to the CSG list in customer B's home base station 707 the identity of customer A's home base station 711. The traffic from customer A's home base station 711, including both the user and the control plane, is routed in a transparent manner through the customer B's home base station 707 so that the content of the traffic, including the identity of the user equipments 701, 703 connected to the customer A's home base station 711 are securely encrypted.

Similar to the second embodiment, a prediction of the network performance measure may be done. The home base station 215 may be dispatched only if this leads to a predicted improvement of the network performance and/or to solving the original problem. For instance, it will not be dispatched if customer B already experiences low data rates due to a congested fixed connection. Nonetheless, it might be dispatched if a small further degradation of customer B's quality of service would lead to a significant improvement of customer A's quality of service. As mentioned before, the proposed solution works with any performance measure and the above performance measure are used only for illustrative purposes.

The fourth step, which refers to step 408-409 in FIG. 4 and step 604 in FIG. 6, is the same as in the second example embodiment. The deployment procedure may be further detailed so as to cover the case when customer A has a physical wireline connection which is not operated by the cellular operator. In this case the customer may be offered a bundled service, including a wireline subscription and a home base station.

The invention claimed is:

1. A method in a communication network node enabling improved communication performance for a user equipment in a communication network, the user equipment being connected to at least one base station serving the user equipment, which at least one base station is connected to a core network, the core network being configured to provide communication services to the user equipment, the method comprises:
   detecting that wireless communication performance between the user equipment and the at least one base station is poor;
   identifying a location of the user equipment where the poor wireless performance is detected;
   obtaining an identity associated with the user equipment;
   obtaining a home address associated with the user equipment based on the obtained identity;
   identifying that the identified location of the user equipment is residential and that the home address corresponds to the identified location;
   searching for a wireline access connection located within a certain distance from the user equipment, which distance is such that a home base station, when connected to the wireline access connection, would be able to provide cellular network service coverage to the user equipment; and
   establishing whether the communication performance for the user equipment would be improved by providing communication services from the core network to the user equipment via the wireline access connection using the home base station.

2. The method according to claim 1, wherein the step of establishing whether the communication performance for the user equipment would be improved further comprising:
   detecting a wireline access connection located at the home address; and
   identifying that there is no home base station associated with the home address.

3. The method according to claim 1, wherein the step of establishing whether the communication performance for the user equipment would be improved further comprising:
   detecting that there is no wireline access connection located at the home address; and
   identifying that a neighbour home base station is connected to the wireline access connection.

4. The method according to claim 1, further comprising:
   providing a list of possible home base station locations based on the identified location, the obtained identity, the obtained home address, the searched wireline access connection and the established improved performance.

5. The method according to claim 1, further comprising:
   deploying a home base station at the home address.

6. The method according to claim 1, wherein the home base station is connected to a neighbour home base station.

7. The method according to claim 1, wherein the steps of obtaining the home address of the user equipment and obtaining the identity of the user equipment are based on international mobile subscriber identity, "IMSI".

8. The method according to claim 1,
   wherein the communication network node is one of a home base station deployment manager, a stand-alone server, and a part of an O&M-subsystem.

9. A communication network node for enabling improved communication performance for a user equipment in a communication network, the user equipment being connected to at least one base station serving the user equipment, which at least one base station is connected to a core network, the core network being configured to provide communication services to the user equipment, the communication network node comprises:
   a detecting unit configured to detect that wireless communication performance between the user equipment and the at least one base station is poor;
   an identifying unit configured to identify a location of the user equipment where the poor wireless performance is detected;
   an obtaining unit configured to:
   obtain an identity associated with the user equipment; and to
   obtain a home address associated with the user equipment based on the obtained identity;
   the identifying unit is further configured to identify that the identified location of the user equipment is residential and that the home address corresponds to the identified location;
   a searching unit configured to search for a wireline access connection located within a certain distance from the user equipment, which distance is such that a home base station, when connected to the wireline access connection, would be able to provide cellular network service coverage to the user equipment; and
   an establishing unit configured to establish whether the communication performance for the user equipment would be improved by providing communication services from the core network to the user equipment via the wireline access connection using the home base station.

10. The communication network node according to claim 9, wherein the establishing unit is further configured to detect a wireline access connection located at the home address, and to identify that there is no home base station associated with the home address.

11. The communication network node according to claim 10, wherein the establishing unit is further configured to detect that there is no wireline access connection located at the home address, and to identify that a neighbour home base station is connected to the wireline access connection.

12. The communication network node according to claim 9, further comprising a providing unit configured to provide a list of possible home base station locations.

13. The communication network node according to claim 9, further comprising a deploying unit configured to deploy a home base station at the home address.

14. The communication network node according to claim 13, wherein the home base station is connected to a neighbour home base station.

15. The communication network node according to claim 9, wherein the communication network node is one of a home base station deployment manager, a stand-alone server, and a part of an O&M-subsystem.

* * * * *